(12) United States Patent
Akinaga et al.

(10) Patent No.: US 8,925,626 B2
(45) Date of Patent: Jan. 6, 2015

(54) COMPOSITION FOR FORMING FILM

(75) Inventors: Keiichi Akinaga, Kanagawa (JP); Tadashi Okawa, Chiba (JP); Kazuhiro Nishijima, Chiba (JP); Eiji Kitaura, Tokyo (JP)

(73) Assignee: Dow Corning Toray Co., Ltd., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/003,478

(22) PCT Filed: Apr. 4, 2012

(86) PCT No.: PCT/JP2012/059835
§ 371 (c)(1),
(2), (4) Date: Sep. 6, 2013

(87) PCT Pub. No.: WO2012/137977
PCT Pub. Date: Oct. 11, 2012

(65) Prior Publication Data
US 2013/0340992 A1 Dec. 26, 2013

(30) Foreign Application Priority Data
Apr. 8, 2011 (JP) ................. 2011-086275

(51) Int. Cl.
C09D 5/00 (2006.01)
C09D 183/04 (2006.01)
F28F 3/00 (2006.01)
C08L 83/04 (2006.01)
C08G 77/08 (2006.01)
C08G 77/12 (2006.01)
F28F 19/02 (2006.01)

(52) U.S. Cl.
CPC ............... *C09D 5/00* (2013.01); *C09D 183/04* (2013.01); *F28F 19/02* (2013.01); *F28F 3/00* (2013.01); *C08L 83/04* (2013.01); *C08G 77/12* (2013.01)

USPC ............... 165/185; 528/14; 528/31; 427/387; 428/447

(58) Field of Classification Search
None
See application file for complete search history.

(56) References Cited

U.S. PATENT DOCUMENTS

| | | | | |
|---|---|---|---|---|
| 3,389,114 A | * | 6/1968 | Burzynski et al. | 523/309 |
| 5,247,011 A | * | 9/1993 | Tsuji et al. | 524/731 |
| 5,468,805 A | * | 11/1995 | Onishi | 524/731 |
| 5,486,257 A | * | 1/1996 | Onishi | 156/305 |
| 5,486,258 A | * | 1/1996 | Onishi | 156/307.5 |
| 5,504,174 A | * | 4/1996 | Onishi | 528/15 |
| 5,625,022 A | * | 4/1997 | Onishi | 528/15 |
| 5,684,110 A | * | 11/1997 | Kawamura | 528/15 |
| 5,804,631 A | * | 9/1998 | Mine et al. | 524/440 |
| 5,895,794 A | * | 4/1999 | Berg et al. | 523/217 |
| 6,297,305 B1 | * | 10/2001 | Nakata et al. | 524/313 |
| 6,881,807 B2 | * | 4/2005 | Terada et al. | 528/31 |
| 7,250,467 B2 | * | 7/2007 | Hatanaka et al. | 524/588 |

FOREIGN PATENT DOCUMENTS

| | | |
|---|---|---|
| EP | 0267728 | 5/1988 |
| EP | 0643106 | 12/1999 |
| JP | 10292151 | 11/1998 |
| JP | 11043777 | 2/1999 |
| JP | 2001295078 | 10/2001 |
| JP | 03637954 | 4/2005 |
| JP | 2010060162 | 3/2010 |

* cited by examiner

*Primary Examiner* — Robert S Loewe
(74) *Attorney, Agent, or Firm* — Howard & Howard Attorneys PLLC

(57) ABSTRACT

A substrate is surface treated using a composition for forming a film that comprises (A) an organoalkoxysilane, (B) an organopolysiloxane having a silicon-bonded hydrogen atom, and (C) a condensation reaction catalyst. This composition for forming a film can form a highly hydrophobic water repellent film provided with sufficient water shedding performance. It is possible to provide a highly hydrophobic substrate such as a heat dissipating body.

14 Claims, No Drawings

COMPOSITION FOR FORMING FILM

CROSS REFERENCE TO RELATED APPLICATIONS

This application is a U.S. national stage filing under 35 U.S.C. §371 of PCT Application No. PCT/JP2012/059835 filed on 4 Apr. 2012, currently pending, which claims the benefit of Japanese Patent Application No. 86275/11 filed 8 Apr. 2011 under 35 U.S.C. §119(a)-(d) and 35 U.S.C. §365 (a). PCT Application No. PCT/JP2012/059835 and Japanese Patent Application No. 86275/11 are hereby incorporated by reference.

TECHNICAL FIELD

The present invention relates to a composition for forming a film, a method for forming a film, a substrate having a film formed on the surface thereof, and use of such a substrate.

BACKGROUND ART

It is known that hydrophobic films are formed by baking an organopolysiloxane having a silicon-bonded hydrogen atom on the surfaces of various types of substrate requiring water repellency.

For example, Japanese Unexamined Patent Application Publication No. 2000-119642 discloses a water repellent composition for forming a film that includes organopolysiloxane having a silicon-bonded hydrogen atom, and Japanese Unexamined Patent Application Publication No. 2010-060162 discloses a heat pump type air conditioner having a heat exchanger provided with cooling fins having a water repellant film composed of such a composition.

PRIOR ART DOCUMENTS

Patent Documents

Patent Document 1: Japanese Unexamined Patent Application Publication No. 2000-119642A
Patent Document 2: Japanese Unexamined Patent Application Publication No. 2010-060162A

SUMMARY OF INVENTION

Technical Problem

However, the hydrophobicity of the surface having the aforementioned water repellant film is insufficient, and for example, in the case of a cooling fin provided with the water repellant film on the surface thereof, it is difficult for water droplets attached to the fin surface to be shed unless the cooling fin is oriented at an angle near vertical. Under conditions in which water droplets are attached to the cooling fin, depending on operating conditions, frost forms on the cooling fin surface, resistance to the flow of air increases in the heat exchanger, the flow of air declines, the air-side heat transfer efficiency of the heat exchange surfaces of the heat exchanger declines, and performance of the heat exchanger declines.

An object of the present invention is to provide a composition and method capable of forming a highly hydrophobic water repellant film provided with sufficient water shedding performance. Moreover, another object of the present invention is to provide a substrate provided with such high hydrophobicity, such as a heat dissipating body.

Solution to Problem

The object of the present invention is attained by a composition for forming a film that includes:
(A) an organoalkoxysilane;
(B) an organopolysiloxane having a silicon-bonded hydrogen atom; and
(C) a condensation reaction catalyst.

The organopolysiloxane having a silicon-bonded hydrogen atom (B) is represented by the following average unit formula (1):

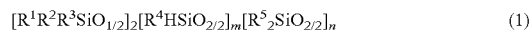

$$[R^1R^2R^3SiO_{1/2}]_2[R^4HSiO_{2/2}]_m[R^5{}_2SiO_{2/2}]_n \qquad (1)$$

In the formula, $R^1$, $R^2$, and $R^3$ are each independently a monovalent hydrocarbon group or hydrogen atom; $R^4$ and $R^5$ are each independently a monovalent hydrocarbon group; m is 0 or a positive number; n is a positive number; (m+n) is in a range of 5 to 500; [m/(m+n)] is in a range of 0 to 0.3; however, when m>0, the number of hydrogen atoms bonded to a silicon atom of a terminal silyl group is in a range of 0 to 2; and when m=0, the number of hydrogen atoms bonded to a silicon atom of a terminal silyl group is 1 or 2.

In the average unit formula (1), m is preferably equal to 0.

The condensation reaction catalyst (C) is preferably at least one selected from the group consisting of zinc-based catalysts, tin-based catalysts, manganese-based catalysts, cobalt-based catalysts, and iron-based catalysts.

The compounded amount of the organoalkoxysilane (A) in the composition for forming a film of the present invention, in terms of total solids mass content of the composition, is from 1 to 90% by mass.

The compounded amount of the organopolysiloxane having a silicon-bonded hydrogen atom (B) in the composition for forming a film of the present invention, in terms of total solids mass content of the composition, is from 1 to 90% by mass.

The compounded amount of the condensation reaction catalyst (C) in the composition for forming a film of the present invention, in terms of total solids mass content of the composition, is from 0.001 to 8% by mass.

The composition for forming a film of the present invention preferably further includes (D) a silicone resin.

The silicone resin (D) is represented by a following average unit formula (2):

$$[R^6SiO_{3/2}]_a[R^7R^8{}_pSiO_{(3-p)/2}]_b \qquad (2)$$

In the formula, $R^6$ and $R^7$ are each independently a monovalent hydrocarbon group; $R^8$ is each independently an alkoxy group or hydroxyl group; however, at least 70 mol % of $R^8$ are alkoxy groups; p is a number in a range of $1 \leq p < 3$; a is 0 or a positive number; b is a positive number; $0.5 \leq b/(a+b) \leq 1.0$.

The composition for forming a film of the present invention may further include (E) a hydrosilylation reaction catalyst.

The present invention also relates to a method for forming a film comprising the steps of: applying to a substrate surface the composition for forming a film, and then heating the composition for forming a film.

The substrate surface preferably comprises an inorganic substance.

The substrate surface may be previously provided with a silicon-containing film.

The heating may be performed in a temperature range of 100 to 300° C.

The present invention also relates to a substrate having a film formed on the surface thereof by the method for forming a film.

The substrate may be used appropriately in a gas including water vapor.

The substrate may be used appropriately for a heat dissipating body. Further, the substrate or the heat dissipating body may be used appropriately in a heat exchanger.

Advantageous Effects of Invention

The composition for forming a film and the method for forming a film of the present invention are capable of forming a highly hydrophobic water repellant film that has sufficient water shedding performance.

The film obtained by the present invention is highly hydrophobic. Even if a water droplet is extremely small, i.e. 2 μL, the film may be provided with excellent water shedding performance in that the water droplet attached to the film slides off simply by slight tilting of the film. For example, the tilt angle may be set to less than or equal to 15° from horizontal.

The substrate of the present invention is equipped with a highly hydrophobic water repellant surface that has sufficient water shedding performance. Thus, the substrate of the present invention is suitable as a heat dissipating body used in air, and the substrate of the present invention is particularly suitable for a heat exchanger for performing heat exchange with external air.

DESCRIPTION OF EMBODIMENTS

The composition for forming a film of the present invention comprises at least:
(A) an organoalkoxysilane,
(B) an organopolysiloxane having a silicon-bonded hydrogen atom, and
(C) a condensation reaction catalyst.

The organoalkoxysilane (A), by combined use with the organopolysiloxane having a silicon-bonded hydrogen atom (B), is a component for forming a cured film that has excellent water shedding characteristics. The organoalkoxysilane (A) may be any organoalkoxysilane having at least one silicon-bonded organic group and at least one alkoxy group. The organoalkoxysilane (A) is preferably represented by the following general formula:

$$R^a_x Si(OR^b)_{4-x}$$

A single type of organoalkoxysilane may be used as the organoalkoxysilane (A), or as may be required, two or more types of organoalkoxysilanes may be used in combination as the organoalkoxysilane (A).

In the general formula, $R^a$ each independently represents a monovalent hydrocarbon group. The monovalent hydrocarbon group is preferably a substituted or unsubstituted linear or branched monovalent hydrocarbon group having from 1 to 30 carbons, as exemplified by: linear or branched alkyl groups having from 1 to 30 carbons, preferably from 1 to 20 carbons, and further preferably from 1 to 6 carbons such as a methyl group, ethyl group, propyl group, butyl group, pentyl group, hexyl group, heptyl group, octyl group, and the like; cycloalkyl groups having from 3 to 30 carbons, preferably from 3 to 20 carbons, and further preferably from 3 to 6 carbons such as a cyclopentyl group, cyclohexyl group, and the like; linear or branched alkenyl groups having from 2 to 30 carbons, preferably from 2 to 20 carbons, and further preferably from 2 to 6 carbons such as a vinyl group, allyl group, butenyl group, and the like; aryl groups having from 6 to 30 carbons, preferably from 6 to 20 carbons, and further preferably from 6 to 10 carbons such as a phenyl group, tolyl group, and the like; aralkyl groups having from 7 to 30 carbons, preferably from 7 to 20 carbons, and further preferably from 7 to 10 carbons such as a benzyl group and the like; and groups obtained by at least partial substitution of the hydrogen atoms bonded to carbons of these groups by a halogen atom such as a fluorine atom and the like. The monovalent hydrocarbon group is preferably a linear alkyl group having from 1 to 6 carbons or an alkenyl group or aryl group. The monovalent hydrocarbon group is further preferably a methyl group, ethyl group, vinyl group, or phenyl group.

In the general formula, $R^b$ each independently represents a linear or branched alkyl group having from 1 to 30 carbons, preferably from 1 to 20 carbons, and further preferably from 1 to 6 carbons, as exemplified by a methyl group, ethyl group, propyl group, butyl group, pentyl group, hexyl group, heptyl group, octyl group, or the like. $R^b$ is preferably a methyl group, ethyl group, or propyl group.

In the general formula, x is an integer in the range of 0 to 3, x is preferably 1 or 2, and x is further preferably 1.

The organoalkoxysilane (A) is exemplified by methyltrimethoxysilane, methyltriethoxysilane, ethyltrimethoxysilane, ethyltriethoxysilane, tert-butyltrimethoxysilane, tert-butyltriethoxysilane, n-hexyltrimethoxysilane, n-hexyltriethoxysilane, octyltrimethoxysilane, octyltriethoxysilane, decyltrimethoxysilane, decyltriethoxysilane, dimethyldimethoxysilane, dimethyldiethoxysilane, tert-butylmethyldimethoxysilane, tert-butylmethyldiethoxysilane, n-hexylmethyldimethoxysilane, n-hexylmethyldiethoxysilane, octylmethyldimethoxysilane, octylmethyldiethoxysilane, decylmethyldimethoxysilane, decylmethyldiethoxysilane, vinyltrimethoxysilane, allyltrimethoxysilane, allyltriethoxysilane, allyltri(ethoxymethoxy)silane, butenyltrimethoxysilane, hexenyltrimethoxysilane, hexenyltriethoxysilane, phenyltrimethoxysilane, phenyltriethoxysilane, methylphenyldimethoxysilane, methylphenyldiethoxysilane, 3,3,3-trifluoropropyltrimethoxysilane, 3,3,3-trifluoropropyltriethoxysilane, 3,3,3-trifluoropropylmethyldimethoxysilane, 3,3,3-trifluoropropylmethyldiethoxysilane, or the like.

No particular limitation is placed on the compounded amount of the organoalkoxysilane (A) in the composition for forming a film of the present invention as long as the compounded amount is capable of forming a water repellent film. In terms of total solids mass content of the composition for forming a film, the compounded amount of the organoalkoxysilane (A) is preferably from 1 to 90% by mass, further preferably from 10 to 85% by mass, and most preferably from 30 to 80% by mass.

The organopolysiloxane having a silicon-bonded hydrogen atom (B), by combined use with the organoalkoxysilane (A), is a component for forming a cured film having excellent water shedding characteristics. The organopolysiloxane having a silicon-bonded hydrogen atom (B) may be any organopolysiloxane that has at least one, and preferably at least two, silicon-bonded hydrogen atoms. The organopolysiloxane having a silicon-bonded hydrogen atom may have a linear structure, branched structure, cyclic structure, or net-like structure; however, the organopolysiloxane having a silicon-bonded hydrogen atom preferably has a linear structure and is represented by the following average unit formula (1):

$$[R^1R^2R^3SiO_{1/2}]_2[R^4HSiO_{2/2}]_m[R^5_2SiO_{2/2}]_n \quad (1)$$

In the formula, $R^1$, $R^2$, and $R^3$ are each independently a monovalent hydrocarbon group or hydrogen atom; $R^4$ and $R^5$ are each independently a monovalent hydrocarbon group; m is 0 or a positive number; n is a positive number; (m+n) is in a range of 5 to 500; [m/(m+n)] is in a range of 0 to 0.3; if m>0, the number of hydrogen atoms bonded to a silicon atom of a terminal silyl group is in a range of 0 to 2; and if m=0, the number of hydrogen atoms bonded to a silicon atom of a terminal silyl group is 1 or 2. As the organopolysiloxane having a silicon-bonded hydrogen atom (B), one type of organopolysiloxane having a silicon-bonded hydrogen atom may be used alone, or as may be required, two or more types of organopolysiloxanes having a silicon-bonded hydrogen atom may be used in combination.

The definition and examples of the monovalent hydrocarbon group in the average unit formula (1) are as described above. The monovalent hydrocarbon group is preferably a linear alkyl group having from 1 to 6 carbons, an alkenyl group, or aryl group. The monovalent hydrocarbon group is further preferably a methyl group, ethyl group, vinyl group, or phenyl group.

In the average unit formula (1), the relationship $0 \le m/(m+n) \le 0.2$ is preferably satisfied, and the relationship $0 \le m/(m+n) \le 0.1$ is further preferably satisfied.

In the average unit formula (1), from the standpoint of ease of adjusting the film thickness, the relationship $5 \le m+n \le 400$ is preferably satisfied, the relationship $8 \le m+n \le 300$ is further preferably satisfied, and the relationship $10 \le m+n \le 200$ is most preferably satisfied.

The component (B) is preferably a dialkylpolysiloxane capped at both molecular terminals by dialkylhydrogensiloxy groups, or a dialkylpolysiloxane capped at one molecular terminal by a dialkylhydrogensiloxy group. Thus, m is preferably equal to 0 in the average unit formula (1).

No particular limitation is placed on the compounded amount of the organopolysiloxane having a silicon-bonded hydrogen atom (B) in the composition for forming a film of the present invention as long as it is possible to form a water repellent film. The compounded amount of the organopolysiloxane having a silicon-bonded hydrogen atom (B), in terms of total solids mass content of the composition for forming a film, is preferably from 1 to 90% by mass, further preferably from 2 to 70% by mass, and most preferably from 5 to 50% by mass. However, if the presence of silicone oil on the surface of the water repellent film is undesirable, the compounded amount of the organopolysiloxane having a silicon-bonded hydrogen atom (B), in terms of total solids mass content of the composition for forming a film, is preferably from 1 to 15% by mass, and further preferably from 1 to 10% by mass.

The condensation reaction catalyst (C), is a catalyst for forming a cured film by condensation reaction between the organoalkoxysilane (A) and the organopolysiloxane having a silicon-bonded hydrogen atom (B). The condensation reaction is a condensation reaction between the silicon-bonded hydrogen atom in the organopolysiloxane having a silicon-bonded hydrogen atom (B) and the silanol group generated by hydrolysis of the alkoxy group in the organoalkoxysilane (A). The condensation reaction catalyst (C) may be used alone as a single type of condensation reaction catalyst, or as may be required, may be used as two or more types of condensation reaction catalysts in combination.

No limitation is placed on the type of the condensation reaction catalyst (C) as long as the catalyst is capable of forming a cured film. The utilized condensation reaction catalyst (C) is exemplified by zinc-based, tin-based, manganese-based, cobalt-based, and iron-based catalysts. The zinc-based, tin-based, manganese-based, cobalt-based, or iron-based catalyst is preferably an organic acid metal salt, and the organic acid is preferably a fatty acid. Specific examples of the (C) curing catalyst include: zinc diacetate, zinc dioctylate, zinc octylate, zinc dineodecanoate, zinc diundecenoate, zinc dimethacrylate; dimethyltin dineodecanoate, dibutyltin diacetate, dibutyltin dioctylate, dibutyltin dilaurate, dioctyl dilaurate, dibutyltin dioleate, dimethoxydibutyltin, tin dioctylate, tin dilaurate, tin diacetate, tin tetraacetate, dibutyltin oxide, dibutyltin benzylmaleate, bis(triethoxysiloxy)dibutyltin, diphenyltin diacetate, tin octylate, dimethyltin neodecanoate; manganese diacetate, manganese dioctylate, manganese octylate; cobalt diacetate, cobalt dioctylate, cobalt octylate; iron diacetate, iron dioctylate, iron octylate, or the like.

Although no particular limitation is placed on the compounded amount of the condensation reaction catalyst (C) in the composition for forming a film of the present invention, the content of the condensation reaction catalyst (C), in terms of total solids mass content of the composition for forming a film, is preferably from 0.01 to 8% by mass, further preferably from 0.1 to 5% by mass, and most preferably from 1 to 3% by mass.

The composition for forming a film of the present invention preferably further comprises a silicone resin (D). The composition of the present invention that includes the silicone resin (D) is able to more precisely form a film having a more uniform thickness. Thus, the composition for forming a film of the present invention including a partially hydrolyzed condensate of the silicone resin (D) may be used for forming a film that is further excellent from the point of corrosion resistance or the like.

The silicone resin (D) is exemplified by DT type or MDT type silicone resins composed of trifunctional siloxane units (referred to hereinafter as the T unit) represented by the unit formula $R^c SiO_{3/2}$, and as may be required, difunctional siloxane units (referred to hereinafter as the D unit) represented by the unit formula $R^c_2 SiO_{2/2}$ and monofunctional siloxane units (referred to hereinafter as the M unit) represented by the unit formula $R^c_3 SiO_{1/2}$; and MQ resins composed of tetrafunctional siloxane units (referred to hereinafter as the Q unit) represented by the unit formula $SiO_{4/2}$ and M units. In the formulae, $R^c$ each independently represents a monovalent hydrocarbon group. The monovalent hydrocarbon group is exemplified by the same groups cited for $R^a$. Moreover, a trace amount of $R^c$ may be a hydroxyl group or an alkoxy group represented by $OR^b$. The silicone resin (D) may be a solid or liquid at room temperature. If the silicone resin (D) is a solid at room temperature, the silicone resin (D) may have a melting point.

Among silicone resins, the silicone resin (D) is preferably represented by the below average unit formula (2):

$$[R^6SiO_{3/2}]_a[R^7R^8_pSiO_{(3-p)/2}]_b \qquad (2)$$

In the formula, $R^6$ and $R^7$ are each independently a monovalent hydrocarbon group; $R^8$ is each independently an alkoxy group or hydroxyl group; however, at least 70 mol % of $R^8$ are alkoxy groups; p is a number in the range of $1 \le p < 3$; a is 0 or a positive number; b is a positive number; $0.5 \le b/(a+b) \le 1.0$.

The silicone resin (D) represented by the average unit formula (2) is preferably a partially hydrolyzed condensate of an organoalkoxysilane, and no limitation is placed on the partially hydrolyzed condensate of an organoalkoxysilane as long as the partially hydrolyzed condensate of an organoalkoxysilane has at least one alkoxy group. The partially hydrolyzed condensate of an organoalkoxysilane may be used as a single type of partially hydrolyzed condensate of an organoalkoxysilane, or as may be required, may be used as a combination of two or more types of partially hydrolyzed condensates of organoalkoxysilanes.

The definition and examples of the monovalent hydrocarbon group in the average unit formula (2) are the same as above. The monovalent hydrocarbon group is preferably a linear alkyl group having from 1 to 6 carbons or an alkenyl group or aryl group. The monovalent hydrocarbon group is further preferably the methyl group, ethyl group, vinyl group, or phenyl group.

The silicone resin (D) preferably has at least one alkenyl group per molecule. In this case, the alkenyl group is preferably the vinyl group.

The alkoxy group in the average unit formula (2) is a linear alkoxy group having from 1 to 30 carbons, preferably from 1 to 20 carbons, and further preferably from 1 to 6 carbons. Specific examples include the methoxy group, ethoxy group, propoxy group, or the like. The alkoxy group in the average unit formula (2) is further preferably the methoxy group or ethoxy group, and is most preferably the methoxy group.

In the average unit formula (2), preferably the relationship $3 \leq a+b \leq 100$ is satisfied, further preferably the relationship $4 \leq a+b \leq 50$ is satisfied, and most preferably the relationship $5 \leq a+b \leq 20$ is satisfied.

Although no particular limitation is placed on the compounded amount of the silicone resin (D) in the composition for forming a film of the present invention, in terms of total solids mass content of the composition for forming a film, the compounded amount of the silicone resin (D) in the composition is preferably from 5 to 80% by mass, further preferably from 10 to 50% by mass, and most preferably from 15 to 43% by mass.

The composition for forming a film of the present invention may further include (E) a hydrosilylation reaction catalyst. When the composition for forming a film of the present invention includes the silicone resin (D), particularly when the silicone resin (D) includes an alkenyl group, the hydrosilylation reaction catalyst (E) is preferably further included in the composition for forming a film. The hydrosilylation reaction catalyst (E) may be used as one type of hydrosilylation reaction catalyst, or as may be required, the hydrosilylation reaction catalyst (E) may be used as a combination of two or more types of hydrosilylation reaction catalysts.

The hydrosilylation reaction catalyst (E) may be a known hydrosilylation catalyst as exemplified by compounds of platinum, ruthenium, rhodium, palladium, osmium, iridium, or the like. The use of a platinum-based catalyst is particularly useful. Platinum-based catalysts that may be used are exemplified by chloroplatinic acid, platinum itself, solid platinum on a support (such as alumina, silica, carbon black, or the like), platinum-vinylsiloxane complexes, plantinum-phosphine complexes, platinum-phosphite complexes, platinum alcoholate catalysts, or the like. During the hydrosilylation reaction, the utilized amount of platinum-based catalyst, in terms of platinum in the total solids mass content of the composition for forming a film, may be about 0.00001 to 0.1% by mass.

The composition for forming a film of the present invention is prepared, for example, by blending the components (A) to (C), and as may be required, the components (D) and/or (E), as well as other optional components and a solvent.

No particular limitation is placed on the type of the optional component as long as the optional component is an additive that does not impede the effect of the obtained water repellent film. Such optional components are exemplified by pigments, dyes, preservative agents, anti-mildew agents, antiaging agents, anticorrosion agents, antirust agents, anti-static agents, fire retardants, antifouling agents, or the like.

Examples of solvents include, but are not limited to, benzene, toluene, xylene, and other aromatic hydrocarbon compounds; diethyl ether, diisopropyl ether, tetrahydrofuran, and other ether compounds; methanol, ethanol, propanol, butanol, hexanol, and other alcohol compounds; acetone, methyl ethyl ketone, methyl isobutyl ketone, and other ketone compounds; ethyl acetate, butyl acetate, and other ester compounds; chloroform, trichloroethylene, carbon tetrachloride, and other halogenated hydrocarbon compounds; n-hexane, n-octane, isooctane, octadecane, and other saturated hydrocarbon compounds; trimethylmethoxysilane, dimethyldimethoxysilane, methyltrimethoxysilane, tetraethoxysilane, and other silane compounds; hexamethyldisiloxane and other volatile silicone compounds, or the like. Moreover, a solvent may be used alone or as a combination of two or more types.

Although no particular limitation is placed on the compounded amount of the solvent in the composition for forming a film of the present invention, this amount, in terms of total mass of the composition for forming a film, is preferably from 50 to 98% by mass, further preferably from 70 to 95% by mass, and most preferably from 80 to 90% by mass. In other words, the solid content in the composition for forming a film of the present invention, in terms of total mass of the composition for forming a film, is preferably from 2 to 50% by mass, further preferably from 5 to 30% by mass, and most preferably from 10 to 20% by mass.

The composition for forming a film of the present invention may form a water repellent film due to curing by heating. Thus, according to the method for forming a film of the present invention, by applying the composition for forming a film to the substrate surface and then heating the composition for forming a film, a highly hydrophobic water repellent film is formed that has sufficient water shedding performance.

The substrate material may be selected as desired, as exemplified by metals, metal oxides, glasses, ceramics, plastics, rubbers, or the like. However, from the standpoint of heat resistance, at least the substrate surface (and preferably the entire substrate) is preferably composed of metal, metal oxide, glass, ceramic, or the like inorganic materials. Metals are exemplified by iron, aluminum, copper, gold, silver, brass, tin, nickel, stainless steel, or the like. Further, various types of plating may be performed on the metal surface.

The substrate surface may be previously provided with a silicon-containing film. The silicon-containing film is preferably a cured silicone film.

The cured silicone film may be any cured silicone film obtained by curing by a known mechanism, such as a condensation reaction-cured type film, hydrosilylation reaction-cured type film, organic peroxide-cured type film, ultraviolet radiation-cured type film, or the like.

The condensation reaction-cured type cured silicone film may be obtained, for example, by curing a curable silicone composition comprising: (1) a diorganopolysiloxane that is liquid at room temperature and has molecular terminals capped by silanol groups or silicon-bonded hydrolyzable groups, or a partially hydrolyzed condensate of organosilane having a silicon-bonded hydrolyzable group; (2) an organosiloxane type crosslinking agent or organosilane type crosslinking agent having a sufficient amount of silicon-bonded hydrolyzable groups for crosslinking the component (1); and (3) a required amount of a condensation reaction promotion catalyst.

The silicon-bonded hydrolyzable group in the component (1) is exemplified by: ketoximo groups [also referred to as "ketoximino" groups, which are groups represented by the general formula: —O—N=$CR^9R^{10}$ (in the formula, $R^9$ and $R^{10}$ are the same or different alkyl group, and an alkyl group having from 1 to 6 carbons is preferred)] such as a dimethylketoxymo group, methylethylketoxymo group, and the like; alkoxy groups such as a methoxy group, ethoxy group, and the like; acyloxy groups such as an acetoxy group and the like; alkylamino groups such as a N-butylamino group, N,N-diethylamino group, and the like; acylamido groups such as an N-methylacetoamido group; N,N-dialkylaminooxy groups such as an N,N-diethylaminooxy group and the like; and alkenyloxy groups such as a propenoxy group and the like. Among these silicon-bonded hydrolyzable groups, alkoxy groups and ketoximo groups are preferred.

Specific examples of the component (2) include: dimethylpolysiloxanes capped at both molecular terminals by a silanol group, silicon-bonded methoxy group, or ethoxy group; methylalkylpolysiloxanes; dimethylsiloxane-methylphenylsiloxane copolymers; methyl(3,3,3-trifluoropropyl)polysiloxane; partially hydrolyzed condensates of alkoxysilanes; or the like. From the standpoint of economics and properties of the cured product, the use of dimethylpolysiloxane or a partially hydrolyzed condensate of alkoxysilane is preferred. Furthermore, the terminal group of the dimethylpolysiloxane capped by a silicon-bonded methoxy group or ethoxy group is exemplified by a methyldimethoxysiloxy group, methyldiethoxysiloxy group, trimethoxysiloxy group, triethoxysiloxy group, methyldimethoxysilylethyl(dimethyl)siloxy group, trimethoxysilylethyl(dimethyl)siloxy group, or the like.

The component (1) may be used as a combination of [missing text] or more types of diorganopolysiloxane or partially hydrolyzed condensate of organosilane. For example, a mixture is cited that comprises: (1-1) a dimethylpolysiloxane capped at both molecular terminals by silanol groups and having a viscosity at 25° C. of 20 to 100 mPa·s, and (1-2) a dimethylpolysiloxane capped at both molecular terminals by silanol groups and having a viscosity at 25° C. of 1,000 to 5,000 mPa·s. Here, the compounding ratio of the component (1-1) to the component (1-2) is preferably in the range of 1/99 to 10/90, expressed as the mass ratio. In this case, the viscosity of the component (1) becomes a little less than 1,000 mPa·s to a little less than 5,000 mPa·s, and coating ability becomes good.

The component (2), which is a crosslinking agent for the component (1), contains at least two, and preferably three or four, silicon-bonded hydrolyzable groups. Typically, this component is an organosilane represented by the general formula: $R^{11}_{y}SiX_{4-y}$ (where $R^{11}$ is a monovalent hydrocarbon group having from 1 to 10 carbons; X is a silicon-bonded hydrolyzable group, and y is 0 or 1) or an organosiloxane oligomer which is a partially hydrolyzed condensate of the organosilane. The definitions and examples of the monovalent hydrocarbon group and silicon-bonded hydrolyzable group are as listed above.

The component (2) is exemplified by tetramethoxysilane, tetraethoxysilane, n-propyl orthosilicate, methyltrimethoxysilane, methyltriethoxysilane, dimethyldimethoxysilane, dimethyldiethoxysilane, vinyltrimethoxysilane, vinyltris(2-methoxyethoxy)silane, 3-aminopropyltriethoxysilane, 3-glycidoxypropylmethyldimethoxysilane, bis-[3-(triethoxysilyl)-propyl]tetrasulfide, bis-[3-(triethoxysilyl)-propyl] disulfide, triethoxysilylpropyl-methacrylate-monosulfide, tetrakis(methylethylketoxime)silane, methyl-tris(methylethylketoximo)silane, vinyl-tris(methylethylketoximo)silane, methyltriacetoxysilane, ethyltriacetoxysilane, methyltriisopropenoxysilane, tetraisopropenoxy silane, and methyl-tri (N,N-diethylamino)silane.

The compounded amount of the component (2) is an amount sufficient for curing the component (1). If the curable silicone composition is a one-liquid type curable silicone composition, the compounded amount of the component (2) is an amount such that long-term storage is possible if the curable silicone composition is shielded from moisture, and so that curing is possible at room temperature upon contact with moisture. This compounded amount of the component (2) is normally in the range of 2 to 30% by mass. Specifically, the compounded amount of the component (2) per 100 parts by mass of the component (1), for example, is from 5 to 100 parts by mass, and a compounded amount in the range of 8 to 40 parts by mass is preferred from the standpoint of curing ability.

Any conventionally known condensation reaction promotion catalyst may be used as the component (3). Specific examples of the component (3) include: organic tin compounds such as dibutyltin diacetate, dibutyltin dioctate, dibutyltin dilaurate, dibutyltin dimaleate, dioctyltin dilaurate, dioctyltin dimaleate, tin octylate, and the like; organic titanate compounds such as tetra(i-propyl)titanate, tetra(n-butyl)titanate, dibutoxybis(acetylacetonate) titanium, isopropyltriisostearoyl titanate, isopropyltris(dioctylpyrophosphate) titanate, bis(dioctylpyrophosphate)oxyacetate titanate, and the like; organic zirconium compounds such as tetrabutyl zirconate, tetrakis(acetylacetonate) zirconium, tetraisobutyl zirconate, butoxytris(acetylacetonate) zirconium, zirconium naphthenate, and the like; organic aluminum compounds such as tris(ethylacetoacetate) aluminum, tris(acetylacetonate) aluminum, and the like; metal salts of organic acids such as zinc naphthenate, cobalt naphthenate, cobalt octylate, and the like; and amine type catalysts such as diethanolamine, triethanol amine, and the like. Furthermore, an organic tin compound or organic titanate compound may be used in the dealcoholization type condensation reaction-curable silicone composition, and an organic titanate compound may be used in a deoxime type condensation reaction-curable silicone composition.

The compounded amount of the component (3) is a sufficient amount to promote the condensation reaction between the component (1) and component (2). For example, the compounded amount of the component (3) is from 0.1 to 15% by mass, and preferably is from 1 to 8% by mass. Based on the component (A), the compounded amount of the component (3) relative to 100 parts by mass of the component (1), for example, is from 0.1 to 20 parts by mass, and is preferably from 1 to 12 parts by mass from the standpoint of curing ability.

The hydrosilylation reaction-cured type cured silicone film may be obtained by heating and curing a curable silicone composition that comprises, for example, a diorganopolysiloxane having at least two silicon-bonded alkenyl groups in a molecule (such as dimethylpolysiloxane capped at both molecular terminals by dimethylvinylsiloxy groups), an organopolysiloxane having at least two and preferably three or more silicon-bonded hydrogen atoms in a molecule (such as methylhydrogenpolysiloxane capped at both molecular terminals by trimethylsiloxy groups), and a hydrosilylation reaction catalyst (such as chloroplatinic acid), and preferably the curable silicone composition further comprises a hydrosilylation reaction suppressing agent.

The organic peroxide-cured type cured silicone film may be obtained, for example, by heating and curing a curable silicone composition comprising a diorganopolysiloxane having at least two alkenyl groups in a molecule, an organic peroxide, or the like.

The ultraviolet radiation-cured type cured silicone film may be obtained for example, by curing a curable silicone composition comprising: (a) a hydrosilylation reaction-cured type organopolysiloxane and a photoinitiator, (b) an acrylic functional group type polysiloxane and a photoinitiator, or (c) an epoxy functional group type organopolysiloxane and a cation generating type catalyst.

The photoinitiator may be a conventionally known compound that generates a free radical due to irradiation by ultraviolet radiation. The photoinitiator may be selected appropriately from organic peroxides, carbonyl compounds, organic sulfur compounds, azo compounds, and the like. Moreover, the cation generating type catalyst is a known onium salt. Specifically, the onium salt may be selected appropriately from triaryl sulfonium salts, triaryl iodonium salts, bis(dodecylphenyl)hexafluoroantimonate, and the like.

The ultraviolet radiation-cured type curable silicone composition may form a cured film by irradiation at a temperature of 0 to 80° C. using ultraviolet radiation preferably in the wavelength range of 200 to 400 nm. Particularly when a cation generating type catalyst is used, the ultraviolet radiation is more preferably in the wavelength range of 200 to 300 nm; and when a hydrosilylation reaction-cured type organopolysiloxane is used, the ultraviolet radiation is more preferably in the wavelength range of 300 to 400 nm.

The application of the composition for forming a film of the present invention to the substrate surface can be carried out using any technique. Examples of application techniques that can be used include dipping methods, impregnation methods, roll coating methods, flow coating methods, brush coating methods, spraying methods, or the like. Although no particular limitation is placed on thickness of the film formed on the substrate surface, from the standpoint of thermal conductivity, this thickness is preferably from 0.1 to 5.0 µm, and further preferably is from 1.0 to 2 µm.

For examples, the heating can be performed in a temperature range of 100 to 300° C., but is preferably performed in a temperature range of 120 to 250° C., and more preferably in a temperature range of 130 to 200° C. Although no particular limitation is placed on the heating time interval, heating is possible, for example, in a time interval range of 1 minute to 1 hour. Prior to heating, the substrate after coating using the composition for forming a film is preferably left standing at a temperature less than or equal to 40° C., and preferably at room temperature, for volatilization of the solvent.

Industrial Applicability

The composition for forming a film and the method for forming a film of the present invention may be used appropriately for various types of substrates requiring excellent water repellency. For example, the composition for forming a film and the method for forming a film of the present invention may be used for surface treatment of a desired substrate used in a water vapor-containing gas and provided with a surface that has the possibility of condensation and/or frost formation. This type of substrate is exemplified by products used at places where water is used such as kitchens, restrooms, bathrooms, or the like.

The substrate of the present invention has high hydrophobicity and is provided with a water repellent surface that has sufficient water shedding performance. Thus, the substrate of the present invention is appropriate for use in a heat exchanger for performing heat exchange with the external air. Specifically, the substrate of the present invention may be used as a heat dissipating body. In particular, the substrate of the present invention is preferably used as a cooling fin of a heat exchanger provided with multiple cooling fins arranged in parallel with a fixed interval therebetween and a heat exchange tube connected to these cooling fins. Also, the heat exchanger more preferably has an air blower for blowing air for heat exchange against the cooling fins.

In particular, the present invention may be used appropriately for a freezer or refrigeration apparatus for a refrigerator or the like, and an air conditioning apparatus such as an air conditioner or the like, used in a humid atmosphere.

EXAMPLES

Hereinafter, the present invention will be described in detail based on practical examples and comparative examples. However, the present invention is not limited to these practical examples. Furthermore, the slide off angles in the practical examples and comparative examples were measured and evaluated by the below described manner. The methyltrimethoxysilane partially hydrolyzed condensates 1 and 2 were prepared by the below described manner.

<Slide Off Angle (Slipping Angle)>

A contact angle meter (DM-700; manufactured by Kyowa Interface Science Co., Ltd.) was used, and slide off angle was measured by the sliding method. Specifically, a 2 µL droplet of water was applied, and while the droplet-attached surface was tilted, the water droplet was observed by camera. The tilt angle at the moment that movement started for both the leading edge and the trailing edge of the droplet was taken to be the slide off angle (slipping angle).

<Preparation of Methyltrimethoxysilane Partially Hydrolyzed Condensate 1>

259.6 g of methyltrimethoxysilane, 28.6 g of methanol, and 0.13 g of trifluoromethane sulfonic acid were placed in a 500 mL four-necked flask equipped with a stirring apparatus, tubular condenser, and thermometer, and the mixture was stirred uniformly. Thereafter, 29.6 g of water was added dropwise, and the mixture was reacted for 1 hour at methanol refluxing temperature. Then, while the methanol was removed at 120° C. and atmospheric pressure, the reaction mixture was reacted for 3 hours. After cooling the reaction mixture to room temperature, the mixture was neutralized by injection of ammonia gas. Then, after stripping was performed at 50 mmHg pressure and 80° C. temperature, the mixture was filtered to obtain the methyltrimethoxysilane partially hydrolyzed condensate 1. The obtained methyltrimethoxysilane partially hydrolyzed condensate 1 was found to have the following average composition formula as a result of $^{13}$C NMR and $^{29}$Si NMR measurement.

$[CH_3SiO_{3/2}]_{3.8}[CH_3R^3{}_{1.3}SiO_{1.7/2}]_{6.5}$ (in the formula, $R^3$ is a methoxy group)

<Preparation of Methyltrimethoxysilane Partially Hydrolyzed Condensate 2>

265.1 g of methyltrimethoxysilane, 23.3 g of methanol, and 0.13 g of trifluoromethane sulfonic acid were placed in a 500 mL four-necked flask equipped with a stirring apparatus, tubular condenser, and thermometer, and the mixture was stirred uniformly. Thereafter, 24.9 g of water was added dropwise, and the mixture was reacted for 1 hour at methanol refluxing temperature. Then, while the methanol was removed at 120° C. and atmospheric pressure, the reaction mixture was reacted for 3 hours. After cooling the reaction mixture to room temperature, the mixture was neutralized by injection of ammonia gas. Then, after stripping was performed at 50 mmHg pressure and 80° C. temperature, the mixture was filtered to obtain the methyltrimethoxysilane partially hydrolyzed condensate 2. The obtained methyltrimethoxysilane partially hydrolyzed condensate 2 was found to have the following average composition formula as a result of $^{13}$C NMR and $^{29}$Si NMR measurement.

$[CH_3SiO_{3/2}]_{0.3}[CH_3R^3{}_{1.3}SiO_{1.7/2}]_{3.0}$ (in the formula, $R^3$ is a methoxy group)

Practical Examples 1 to 16 and Comparative Examples 1 and 2

The compositions for forming films of Practical Examples 1 to 14 and Comparative Examples 1 and 2 were prepared by uniform mixing of the components indicated in Tables 1 to 3 using the number of parts by mass listed in Tables 1 to 3. Furthermore, an amount of platinum-based catalyst was blended to result in a platinum metal content of 10 ppm in the solids of the composition for forming a film. An aluminum test panel (JIS A 1050P) was prepared by degreasing by immersion in an alkaline degreasing agent, by washing in running water and then washing in distilled water, and then heating and drying. The prepared aluminum test panel was immersed in the composition and then pulled up to coat the surface of the test panel with the composition for forming a film. The coated test panel was set aside at room temperature for several minutes to allow volatilization of isooctane. Then the test panel was heated at 200° C. for 20 minutes to form a hydrophobic cured film on the surface of the test panel.

The slide off angle (slipping angle) was measured on the hydrophobic cured film obtained in the above manner. These results are shown in Tables 1 to 3.

In the table, $M^H$ and D have the below described meanings.
$M^H$: This represents the $(H(CH_3)_2SiO_{1/2})$ unit.
D: This represents the $((CH_3)_2SiO_{2/2})$ unit, and the appended number represents the average number of D units in the chain.

Moreover, methyl silicate in the tables is MKC Silicate MS 56 (commercial product name; average of about 10 silicon atoms per molecule) produced by Mitsubishi Chemical Corporation. The MQ resin in the tables is a silicone resin represented by the following average unit formula.

$$[(CH_3)_3SiO_{1/2}]_{0.44}[SiO_{4/2}]_{0.56}$$

This has a weight average molecular weight of about 4,600 (expressed in terms of standard polystyrene) as determined by gel permeation chromatography. Hydroxyl group content was about 3% by weight.

TABLE 1

|  | Practical Example 1 | Practical Example 2 | Practical Example 3 | Practical Example 4 | Practical Example 5 | Practical Example 6 | Practical Example 7 |
|---|---|---|---|---|---|---|---|
| Methyltrimethoxysilane | 5.83 | 6.90 | 5.60 | 4.50 | 4.20 | 5.60 | 5.83 |
| $M^H D_{98} M^H$ | 0.34 | 0.67 | 0.67 | 0.67 | 0.67 | 0.67 | 0.34 |
| Methyltrimethoxysilane Partially hydrolyzed condensates 1 | 2.91 | 1.50 | 2.80 | 3.90 | 4.20 | 2.80 | — |
| Methyl silicate | — | — | — | — | — | — | 2.91 |
| Dimethyltin neodecanoate | 0.18 | 0.18 | 0.18 | 0.18 | 0.18 | 0.18 | 0.18 |
| Isooctane | 91 | 91 | 91 | 91 | 91 | 91 | 91 |
| Slide off angle (slipping angle) | 5 | 5 | 5 | 7 | 13 | 5 | 6 |

TABLE 2

|  | Practical Example 8 | Practical Example 9 | Practical Example 10 | Practical Example 11 | Practical Example 12 | Practical Example 13 |
|---|---|---|---|---|---|---|
| Methyltrimethoxysilane | — | — | 7.89 | 5.71 | 3.81 | 3.81 |
| Vinyl trimethoxysilane | 5.60 | 5.52 | — | — | — | — |
| $M^H D_{98} M^H$ | 0.67 | 1.18 | 1.18 | 3.36 | 3.36 | 3.36 |
| Methyltrimethoxysilane Partially hydrolyzed condensates 1 | 2.80 | 2.37 | — | — | 1.90 | — |
| MQ resin | — | — | — | — | — | 1.90 |
| Dimethyltin neodecanoate | 0.18 | 0.18 | 0.18 | 0.18 | 0.18 | 0.18 |
| Platinum-based catalyst | 10 ppm | — | — | — | — | — |
| Isooctane | 91 | 91 | 91 | 91 | 91 | 91 |
| Slide off angle (slipping angle) | 6 | 6 | 6 | 4 | 5 | 15 |

TABLE 3

|  | Practical Example 14 | Practical Example 15 | Practical Example 16 | Comparative Example 1 | Comparative Example 2 |
|---|---|---|---|---|---|
| Methyltrimethoxysilane | 5.60 | 5.26 | 3.95 | — | — |
| Vinyl trimethoxysilane | 5.60 | 5.52 | — | — | — |
| $M^H D_{98} M^H$ | 0.67 | 1.18 | 1.18 | 0.67 | 0.67 |
| Methyltrimethoxysilane Partially hydrolyzed condensates 1 | — | — | — | 8.40 | 7.89 |
| Methyltrimethoxysilane Partially hydrolyzed condensates 2 | 2.80 | 2.63 | 3.95 | — | — |
| Dimethyltin neodecanoate | 0.18 | 0.18 | 0.18 | 0.18 | 0.18 |
| Isooctane | 91 | 91 | 91 | 91 | 91 |
| Slide off angle (slipping angle) | 4 | 4 | 4 | 33 | 18 |

From the Practical Examples 1 to 14 and the Comparative Examples 1 and 2, it is understood that the film forming composition of the present invention can form a water repellant cured film having excellent water shedding performance. Conversely, the cured films obtained under conditions without the organoalkoxysilane are understood to have decreased water repellency and worsening of water shedding performance.

The invention claimed is:
1. A composition for forming a film comprising:
(A) an organoalkoxysilane;
(B) an organopolysiloxane having a silicon-bonded hydrogen atom, wherein: the organopolysiloxane having a silicon-bonded hydrogen atom is represented by average unit formula (1):

$$[R^1 R^2 R^3 SiO_{1/2}]_2 [R^4 HSiO_{2/2}]_m [R^5{}_2 SiO_{2/2}]_n \qquad (1)$$

wherein $R^1$, $R^2$, and $R^3$ are each independently a monovalent hydrocarbon group or hydrogen atom; $R^4$ and $R^5$ are each independently a monovalent hydrocarbon group; m is 0 or a positive number; n is a positive number; (m+n) is in a range of 5 to 500; [m/(m+n)] is in a range of 0 to 0.3; with the proviso that, however, when m>0, the number of hydrogen atoms bonded to a silicon atom of a terminal silyl group is in a range of 0 to 2, and when m=0, the number of hydrogen atoms bonded to a silicon atom of a terminal silyl group is 1 or 2;

(C) a condensation reaction catalyst; and
(D) a silicone resin represented by the following average formula (2):

$$[R^6SiO_{3/2}]_a[R^7R^8_pSiO_{(3-p)/2}]_b \qquad (2)$$

wherein, $R^6$ and $R^7$ are each independently a monovalent hydrocarbon group; $R^8$ is an alkoxy group or a hydroxyl group; however, at least 70 mol % of $R^8$ are alkoxy groups; p is a number in a range of $1 \leq p < 3$; a is 0 or a positive number; b is a positive number; and $0.5 \leq b/(a+b) \leq 1.0$.

2. The composition for forming a film according to claim 1, wherein m=0 in the average unit formula (1).

3. The composition for forming a film according to claim 1, wherein the condensation reaction catalyst (C) is at least one selected from the group consisting of zinc-based catalysts, tin-based catalysts, manganese-based catalysts, cobalt-based catalysts, and iron-based catalysts.

4. The composition for forming a film according to claim 1, wherein a compounded amount of the organoalkoxysilane (A), in terms of total solid mass content of the composition, is from 1 to 90% by mass.

5. The composition for forming a film according to claim 1, wherein a compounded amount of the organopolysiloxane having a silicon-bonded hydrogen atom (B), in terms of total solid mass content of the composition, is from 1 to 90% by mass.

6. The composition for forming a film according to claim 1, wherein a compounded amount of the condensation reaction catalyst (C), in terms of total solid mass content of the composition, is from 0.001 to 8% by mass.

7. The composition for forming a film according to claim 1, further comprising (E) a hydrosilylation reaction catalyst.

8. A method for forming a film comprising the steps of:
   applying to a substrate surface a composition for forming a film comprising:

(A) an organoalkoxysilane;
(B) an organopolysiloxane having a silicon-bonded hydrogen atom, wherein: the organopolysiloxane having a silicon-bonded hydrogen atom is represented by average unit formula (1):

$$[R^1R^2R^3SiO_{1/2}]_2[R^4HSiO_{2/2}]_m[R^5_2SiO_{2/2}]_n \qquad (1)$$

wherein $R^1$, $R^2$, and $R^3$ are each independently a monovalent hydrocarbon group or hydrogen atom; $R^4$ and $R^5$ are each independently a monovalent hydrocarbon group; m is 0 or a positive number; n is a positive number; (m+n) is in a range of 5 to 500; [m/(m+n)] is in a range of 0 to 0.3; with the proviso that, however, when m >0, the number of hydrogen atoms bonded to a silicon atom of a terminal silyl group is in a range of 0 to 2, and when m = 0, the number of hydrogen atoms bonded to a silicon atom of a terminal silyl group is 1 or 2;

(C) a condensation reaction catalyst; and
(D) a silicone resin represented by the following average formula (2):

$$[R^6SiO_{3/2}]_a[R^7R^8_pSiO_{(3-p)/2}]_b \qquad (2)$$

wherein, $R^6$ and $R^7$ are each independently a monovalent hydrocarbon group; $R^8$ is an alkoxy group or a hydroxyl group; however, at least 70 mol % of $R^8$ are alkoxy groups; p is a number in a range of $1 \leq p < 3$; a is 0 or a positive number; b is a positive number; and $0.5 \leq b/(a+b) \leq 1.0$; and heating the composition for forming a film.

9. The method for forming a film according to claim 8, wherein the substrate surface comprises an inorganic material.

10. The method for forming a film according to claim 8, wherein the substrate surface has a silicon-containing film.

11. A substrate having a film formed on the surface thereof by the method for forming a film described in claim 8.

12. A heat dissipating body comprising the substrate described in claim 11.

13. A heat exchanger comprising the heat dissipating body of claim 12.

14. A heat exchanger comprising the substrate of claim 11.

* * * * *